(12) United States Patent
Kusada et al.

(10) Patent No.: US 8,590,322 B2
(45) Date of Patent: Nov. 26, 2013

(54) OIL SEPARATOR AND REFRIGERANT COMPRESSOR HAVING THE SAME

(75) Inventors: Takashi Kusada, Okazaki (JP);
Yoichiro Kawamoto, Nagoya (JP);
Tadashi Hotta, Okazaki (JP); Shigeki Iwanami, Okazaki (JP)

(73) Assignees: Denso Corporation, Kariya (JP);
Nippon Soken, Inc., Nishio (JP)

( * ) Notice: Subject to any disclaimer, the term of this patent is extended or adjusted under 35 U.S.C. 154(b) by 1352 days.

(21) Appl. No.: 12/284,139

(22) Filed: Sep. 18, 2008

(65) Prior Publication Data
US 2009/0071188 A1    Mar. 19, 2009

(30) Foreign Application Priority Data

Sep. 19, 2007  (JP) ................. 2007-242625
Oct. 31, 2007  (JP) ................. 2007-282739
Jun. 4, 2008   (JP) ................. 2008-147395

(51) Int. Cl.
*F25B 43/02*  (2006.01)
*F01C 1/02*   (2006.01)
*F01C 21/04*  (2006.01)

(52) U.S. Cl.
USPC ............ 62/84; 62/468; 62/470; 418/55.6; 418/100

(58) Field of Classification Search
USPC ............ 62/84, 468, 470, 418; 184/43, 70, 77; 210/167.32
See application file for complete search history.

(56) References Cited

U.S. PATENT DOCUMENTS

| | | | | |
|---|---|---|---|---|
| 4,343,599 A | * | 8/1982 | Kousokabe | 418/55.6 |
| 4,365,941 A | * | 12/1982 | Tojo et al. | 417/372 |
| 5,159,820 A | * | 11/1992 | Ohishi et al. | 62/468 |
| 6,129,775 A | | 10/2000 | Conrad et al. | |
| 6,152,713 A | * | 11/2000 | Hisanaga et al. | 418/55.2 |

(Continued)

FOREIGN PATENT DOCUMENTS

| | | |
|---|---|---|
| JP | 3-129273 | 6/1991 |
| JP | 2003-013858 | 1/2003 |

(Continued)

OTHER PUBLICATIONS

Office Action dated Sep. 24, 2009 in corresponding Japanese application No. 2007-282739.

(Continued)

*Primary Examiner* — Khoa Huynh
*Assistant Examiner* — Timothy K Trieu
(74) *Attorney, Agent, or Firm* — Harness, Dickey & Pierce, PLC

(57) ABSTRACT

An oil separator includes a separation part and an oil storage part. The separation part includes a separation cylinder, an inner cylinder disposed in the separation cylinder and an inlet pipe connecting to the separation cylinder tangential to an inner surface of the separation cylinder. The separation part defines an inlet opening to introduce $CO_2$ refrigerant containing oil in the separation cylinder. The separation cylinder separates the oil from the $CO_2$ refrigerant by means of centrifugal force. A ratio of a flow rate (kg/h) of the $CO_2$ refrigerant flowing in the separation cylinder to an area ($mm^2$) of the inlet opening is at least 4. Alternative to or in addition to the above, a ratio of a distance (mm) from an end of the inner cylinder to a bottom wall of the separation cylinder to an inner diameter (mm) of the separation cylinder is at least 2.5.

9 Claims, 8 Drawing Sheets

(56) References Cited

U.S. PATENT DOCUMENTS

| | | | |
|---|---|---|---|
| 6,485,535 B1 * | 11/2002 | Linnersten et al. | 55/319 |
| 6,749,404 B2 * | 6/2004 | Gennami et al. | 417/212 |
| 7,736,136 B2 * | 6/2010 | Ohtake | 418/55.6 |
| 2005/0129556 A1 * | 6/2005 | Ito | 418/55.6 |
| 2007/0144206 A1 | 6/2007 | Tsuboi et al. | |
| 2008/0226483 A1 | 9/2008 | Iwanami | |

FOREIGN PATENT DOCUMENTS

| | | |
|---|---|---|
| JP | 2005-180808 | 7/2005 |
| JP | 2005-201145 | 7/2005 |
| JP | 2005-299391 | 10/2005 |
| JP | 2006-90673 | 4/2006 |
| JP | 2006-207917 | 8/2006 |
| JP | 2006-322701 | 11/2006 |
| JP | 2007-170783 | 7/2007 |
| WO | WO 01/22013 | 3/2001 |

OTHER PUBLICATIONS

Office Action dated Nov. 16, 2010, in corresponding Japanese Application No. 2007-282739.

Office Action dated Jan. 6, 2010 in corresponding Japanese application No. 2007-282739.

Office Action dated May 7, 2010 in German Application No. 102008047447.9.

* cited by examiner

UNDER RATED CONDITION $$\left(\frac{\Delta h}{h}\right)_{134a} : \left(\frac{\Delta h}{h}\right)_{CO_2} = 4.5 : 1$$

$$\left(\frac{\Delta h}{\Delta p}\right)_{134a} : \left(\frac{\Delta h}{\Delta p}\right)_{CO_2} = 3.5 : 1$$

| L/D | 2 | 2.5 | 3 | 3.5 | 4 | 4.5 | 5 |
|---|---|---|---|---|---|---|---|
| OIL SEPARATION EFFICIENCY (%) | 92.0 | 94.2 | 95.0 | 95.4 | 95.8 | 95.9 | 96.0 |

OIL SEPARATOR AND REFRIGERANT COMPRESSOR HAVING THE SAME

CROSS REFERENCE TO RELATED APPLICATION

This application is based on Japanese Patent Applications No. 2007-242625 filed on Sep. 19, 2007, No. 2007-282739 filed on Oct. 31, 2007 and No. 2008-147395 filed on Jun. 4, 2008, the disclosure of which are incorporated herein by reference.

FIELD OF THE INVENTION

The present invention relates to an oil separator for separating oil from gas refrigerant by means of centrifugal force and a refrigerant compressor having the oil separator.

BACKGROUND OF THE INVENTION

In general, a compressor of a refrigerant cycle is lubricated by a lubricating oil mixed with gas refrigerant. If the oil is discharged from the compressor into the refrigerant cycle with the gas refrigerant, a coefficient of performance (hereinafter, system COP) of the refrigerant cycle is reduced. The system COP is reduced as the amount of the oil discharged from the compressor is increased. It is known to arrange a centrifugal oil separator at an outlet of the compressor in order to reduce the amount of oil discharged in the refrigerant cycle from the compressor.

For example, Japanese Unexamined Patent Application Publication No. 3-129273 (U.S. Pat. No. 5,159,820) describes an oil separator having a separation chamber and an oil storage chamber. The separation chamber is disposed at a rear part of a rear housing of a compressor. The separation chamber has an inlet opening on its side wall, a refrigerant discharge pipe at its upper portion, and an oil outlet opening. Refrigerant compressed in the compressor is introduced in the separation chamber through the inlet opening. In the separation chamber, oil is separated from the refrigerant. After the oil separation, the refrigerant is discharged from the separation chamber through the refrigerant discharge pipe, and the oil is introduced in the oil storage chamber through the oil outlet opening. The oil storage chamber is disposed under the oil separation chamber, and stores the oil therein.

Recently, $CO_2$ refrigerant is used in consideration of environmental issues. A difference in density between the $CO_2$ refrigerant and the oil is smaller than a difference in density between chlorofluorocarbon refrigerant and the oil. Therefore, in a conventional oil separator, it is difficult to sufficiently separate the oil from the $CO_2$ refrigerant by means of centrifugal force. As a result, oil separation efficiency reduces. In such a case, an oil rate in a refrigerant cycle will increase, and hence efficiency of heat exchange in a gas cooler and an evaporation will reduce. Further, the system COP reduces.

To address the foregoing issue, it is considered to reduce an inner diameter of a separation cylinder defining a separation chamber in order to increase the centrifugal force. In such a case, however, a clearance between an inner surface of the separation cylinder and an outer surface of a refrigerant discharge pipe reduces. With this, if the gas refrigerant introduced in the separation cylinder collides with the discharge cylinder, the velocity of turning flow of the refrigerant reduces. As a result, the oil separation efficiency reduces.

If the oil separation efficiency reduces, the amount of oil stored in the oil storage chamber reduces. In such a case, it is difficult to supply the compressor with a sufficient amount of oil. As a result, reliability of working the compressor will reduce.

SUMMARY OF THE INVENTION

The present invention is made in view of the foregoing matter, and it is an object of the present invention to provide an oil separator having a structure capable of improving oil separation efficiency. It is another object of the present invention to provide a refrigerant compressor having such an oil separator.

According to a first aspect of the present invention, an oil separator for a $CO_2$ refrigerant cycle includes a separation part and an oil storage part. The separation part includes a separation cylinder, an inner cylinder and an inlet pipe. The inner cylinder has an outer diameter smaller than inner diameter of the separation cylinder and is disposed in the separation cylinder. The inlet pipe connecting to the separation cylinder tangential to an inner surface of the separation cylinder. The separation part defines an inlet opening in the inner surface of the separation cylinder to allow $CO_2$ refrigerant containing oil from the inlet pipe to the separation cylinder. The separation part separates the oil from the $CO_2$ refrigerant by means of a centrifugal force while turning or whirling the $CO_2$ refrigerant containing the oil along the inner surface of the separation cylinder. The oil storage part is disposed in communication with the separation cylinder. The oil storage part stores separated oil therein. The separation part is configured such that a ratio G/A of a flow rate G (kg/h) of the $CO_2$ refrigerant containing the oil and flowing in the separation cylinder from the inlet pipe under a rated condition to a cross-sectional area A ($mm^2$) of the inlet opening is at least 4.

In such a structure, the velocity of the $CO_2$ refrigerant flowing in the separation cylinder from the inlet pipe is increased while suppressing pressure loss of the refrigerant, and thus centrifugal force is increased. Accordingly, the oil separation efficiency is improved.

According to a second aspect of the present invention, an oil separator for a $CO_2$ refrigerant cycle includes a separation part and an oil storage part. The separation part includes a separation cylinder having a bottom wall, an inner cylinder and an inlet pipe. The inner cylinder is disposed in the separation cylinder. The inlet pipe connects to the separation cylinder tangential to an inner surface of the separation cylinder. The separation part defines an inlet opening in the inner surface of the separation cylinder to allow $CO_2$ refrigerant containing oil from the inlet pipe to the separation cylinder. The separation part separates the oil from the $CO_2$ refrigerant by means of a centrifugal force while turning or whirling the $CO_2$ refrigerant containing the oil along the inner surface of the separation cylinder. The inner cylinder having an end within the separation cylinder, and the end defines a discharge port for discharging separated $CO_2$ refrigerant from the separation part. The bottom wall of the separation cylinder defines a communication hole. The oil storage part is disposed in communication with the separation cylinder through the communication hole. The oil storage part stores separated oil therein. The separation part is configured such that a ratio L/D of a distance L (mm) from the end of the inner cylinder to the bottom wall of the separation cylinder to an inner diameter D (mm) of the separation cylinder is at least 2.5.

Accordingly, the separation part restricts the separated oil from flying up. As such, the oil separation efficiency improves.

According to a third aspect of the present invention, such oil separators can be integrated with a refrigerant compressor.

In such a case, a distance of refrigerant path from the refrigerant compressor to the oil separator is reduced. Therefore, pressure loss is reduced, and thus the oil separation efficiency is further improved. Since the oil separation efficiency of the oil separator is improved, the oil is sufficiently stored in the oil storage part. The oil can be sufficiently introduced to the refrigerant compressor from the oil storage part, and thus lubrication of the refrigerant compressor improves. Also, since the oil is sufficiently stored in the oil storage part, discharge pulsation of the refrigerant compressor is improved.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Figure 1:
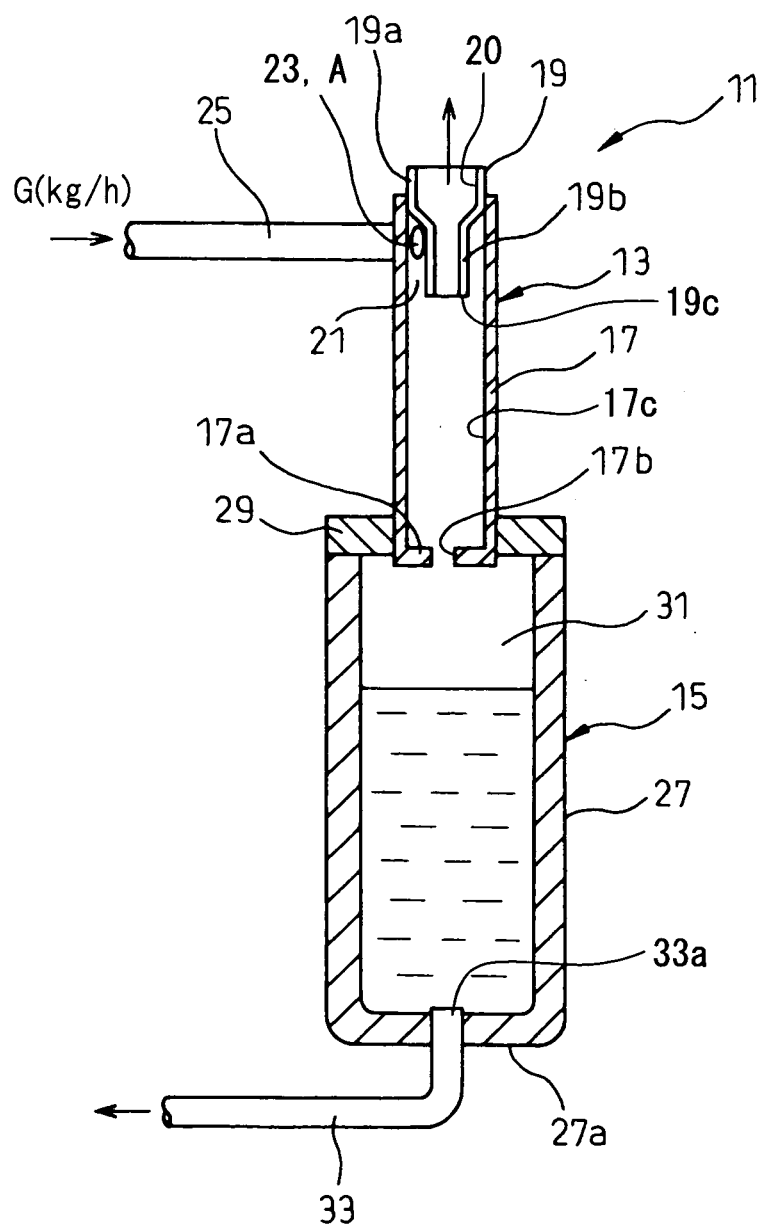
FIG. 1 is a schematic cross-sectional view of an oil separator according to a first embodiment of the present invention.

Exemplary embodiments of the present invention will now be described with reference to the accompanying drawings. Like components are denoted by like reference characters and a description thereof is not repeated.

A first embodiment of the present invention will be described with reference to FIGS. 1 to 4. Referring to FIG. 1, an oil separator 11 of the present embodiment is employed in a $CO_2$ refrigerant cycle through which a $CO_2$ refrigerant mainly containing $CO_2$ circulates for a household apparatus, a vehicle air conditioner or the like. The oil separator 11 generally includes a separation part 13 and an oil storage part 15. The separation part 13 separates oil (lubricating oil) from the $CO_2$ refrigerant. The oil storage part 15 stores the separated oil therein.

The separation part 13 includes a separation cylinder 17 and a refrigerant discharge pipe 19. The separation cylinder 17 has a tubular shape with a bottom end. An inner diameter of the separation cylinder 17 is substantially constant from a top end toward the bottom end. The top end of the separation cylinder 17 is open, and the refrigerant discharge pipe 19 passes through the top end of the separation cylinder 17.

The refrigerant discharge pipe 19 has a first pipe portion 19a and a second pipe portion (inner cylinder) 19b. The first pipe portion 19a is fitted in the opening of the top end of the separation cylinder 17. The second pipe portion 19b has a cylindrical shape with a diameter smaller than a diameter of the first pipe portion 19a. The second pipe portion 19b is, for example, formed by reducing a diameter of a lower end of the first pipe portion 19a.

The second pipe portion 19b is disposed in the separation cylinder 17. A cylindrical inner chamber 21 is provided between the separation cylinder 17 and the refrigerant discharge pipe 19. The refrigerant discharge pipe 19 forms a discharge passage 20 for discharging the refrigerant from which the oil is separated from the separation part 13. The refrigerant discharge pipe 19 is in communication with an external device, such as a water-refrigerant heat exchanger, of the refrigerant cycle through pipes.

The separation cylinder 17 has an inlet opening 23 on its inner surface 17c at a location opposing to an outer surface of the second pipe portion 19b of the refrigerant discharge pipe 19. An inlet pipe 25 is in communication with the inlet opening 23 for introducing the refrigerant containing the oil into the separation part 13. The inlet pipe 25 allows communication between a discharge port of a compressor and the separation part 13.

The inlet pipe 25 is connected tangential to the inner surface 17c of the separation cylinder 17 such that the refrigerant introduced in the separation cylinder 17 from the inlet opening 23 turns or whirls in the cylindrical inner space 21 along the inner surface 17c at a high speed. Because the oil has a specific gravity greater than a specific gravity of the refrigerant, the oil sticks to the inner surface 17c by means of centrifugal force generated while whirling the refrigerant at the high speed. As such, the oil is separated from the refrigerant.

The oil storage part 15 is disposed under the separation part 13. The oil storage part 15 includes an oil tank 27 having a tubular shape with a bottom end and a cover 29 covering a top end of the oil tank 27. A bottom wall portion 17a of the separation cylinder 17 is coupled to the cover 29.

The bottom wall portion 17a is formed with a communication hole 17b. The communication hole 17b allows communication between the separation part 13 and the oil storage part 15. The oil separated from the refrigerant in the separation part 13 flows in the oil tank 27 through the communication hole 17b.

An oil pipe 33 having an oil port 33a is coupled to the bottom wall 27a of the oil tank 27. The oil stored in the oil tank 27 is introduced to the compressor or the like through the oil pipe 33 for lubrication of necessary portions such as a bearing part and a sliding part of the compressor.

The oil separator 11 is further configured such that a ratio of a flow rate G (kg/h) of the $CO_2$ refrigerant under a system rated condition to a cross-sectional area A ($mm^2$) of the inlet opening 23 is at least 4 and at most 20 ($4 \leq G/A \leq 20$).

For example, according to a system rated condition of a household heat pump water heating apparatus, a mass flow rate of the refrigerant is 68 kg/h when a high pressure side of the refrigerant cycle is 9.8 MPa and a low pressure side of the refrigerant cycle is 3.9 MPa.

Here, the system rated condition is a most general operation condition when performance and efficiency of a device is evaluated and compared based on an evaluation standard, which is generally set in the industry. For example, the evaluation standard of the household heat pump water heating apparatus is set as standard JRA4050 by the Japan Refrigeration and Air Conditioning Industry Association. The system rated condition is an intermediate season standard heating condition of several performance examining conditions stated in an appendix A of the standard JRA4050. For example, a rated heating capacity is a heating capacity per unit time calculated from the temperature of water and the volume of water, which are measured seven times every 5 minutes after the apparatus has been operated equal to or more than one hour since the apparatus reached a normal condition, when the apparatus is operated such that the water is heated to a standard heating temperature under a condition where a dry-bulb temperature and a wet-bulb temperature of outside air are 16° C. and 12° C., respectively, and the temperature of the water introduced in the apparatus is 17° C. The flow rate of the refrigerant under the system rated condition corresponds to the flow rate of the refrigerant in such a condition.

Regarding a vehicular air conditioner, the evaluation standard is set in JISD1618 (1986). For example, a rated cooling capacity is a cooling capacity calculated from the dry-bulb temperature and wet-bulb temperature of air at an inlet and an outlet of a cooling device measured more than three times every five minutes after a preliminary working of more than thirty minutes under a working condition in which a rotation speed of a compressor is set to 1800 rpm when the dry-bulb temperature and the wet-bulb temperature of air at an inlet of an evaporator are 27° C. and 19.5° C., and the dry-bulb temperature of air at an inlet of a condenser is 35° C. The refrigerant flow rate under the system rated condition corresponds to the flow rate of the refrigerant in such a condition.

Regarding the thermodynamic property of $CO_2$ immediately after compression in the refrigerant cycle, $CO_2$ has a density greater than a density of HFC-134a. Therefore, a difference in density between $CO_2$ and the oil is smaller than a difference in density between HFC-134a and the oil. As such, it is necessary to increase centrifugal force by increasing the velocity of the refrigerant in the cylindrical inner space 21 so as to improve the oil separation efficiency. In general, if the cross-sectional area A of the inlet opening 23 is reduced so as to increase the velocity of the refrigerant, pressure loss increases and refrigerating efficiency reduces.

Figure 3:
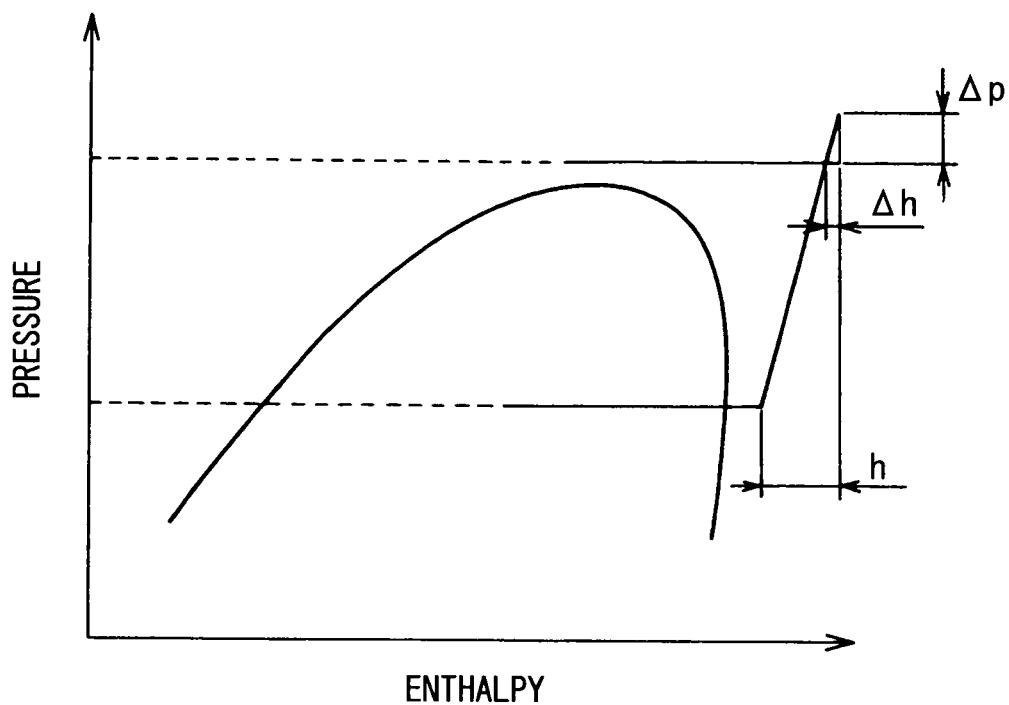
FIG. 3 is a graph showing a relationship between a change of enthalpy and pressure loss during compression of $CO_2$ refrigerant and HFC-134a refrigerant according to the first embodiment.

As shown in FIG. 3, in the $CO_2$ refrigerant cycle, a ratio of energy loss $\Delta h$ due to pressure loss $\Delta p$ when discharged from the compressor to the amount of increase in enthalpy h during compression is about one fifth of that of a HFC refrigerant cycle using HCF-base refrigerant. (e.g., $(\Delta h/h)_{134a}:(\Delta h/h)_{CO2}=4.5:1$) Therefore, an absolute value of allowable pressure loss $\Delta p$ in the $CO_2$ refrigerant cycle can be increased, as compared with the HFC refrigerant cycle.

Further, in the $CO_2$ refrigerant cycle, a ratio of the energy loss $\Delta h$ to the pressure loss $\Delta p$ is about one fourth of that of the HFC refrigerant cycle. (e.g., $(\Delta h/\Delta p)_{134a}:(\Delta h/\Delta p)_{CO2}=3.5:1$) Therefore, the pressure loss can be compensated with small power in the $CO_2$ refrigerant cycle, as compared with the HFC refrigerant cycle.

Figure 2A:
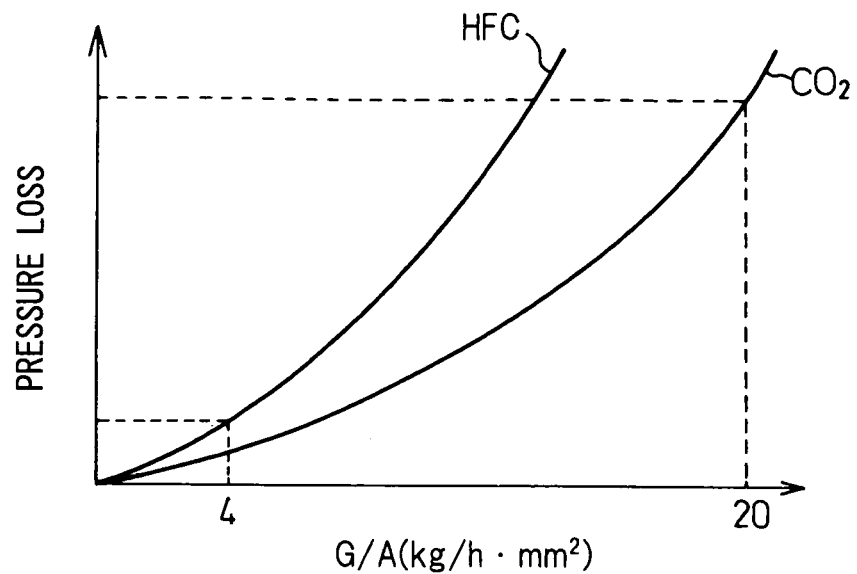
FIG. 2A is a graph showing a relationship between a ratio G/A and pressure loss, in which G is a flow rate of refrigerant flowing in a separation part of the oil separator and A is an area of an inlet opening of the separation part, according to the first embodiment.

As shown in FIG. 2A, in the $CO_2$ refrigerant cycle, an increase in the pressure loss in accordance with an increase in the ratio G/A is smaller than that of the HFC refrigerant cycle.

As such, an increase in the energy loss of the $CO_2$ refrigerant cycle is smaller than an increase in the energy loss of the HFC refrigerant cycle. Accordingly, the ratio G/A is set at least 4 and at most 20 so as to improve the oil separation efficiency without largely affecting the compressor power.

Figure 2B:
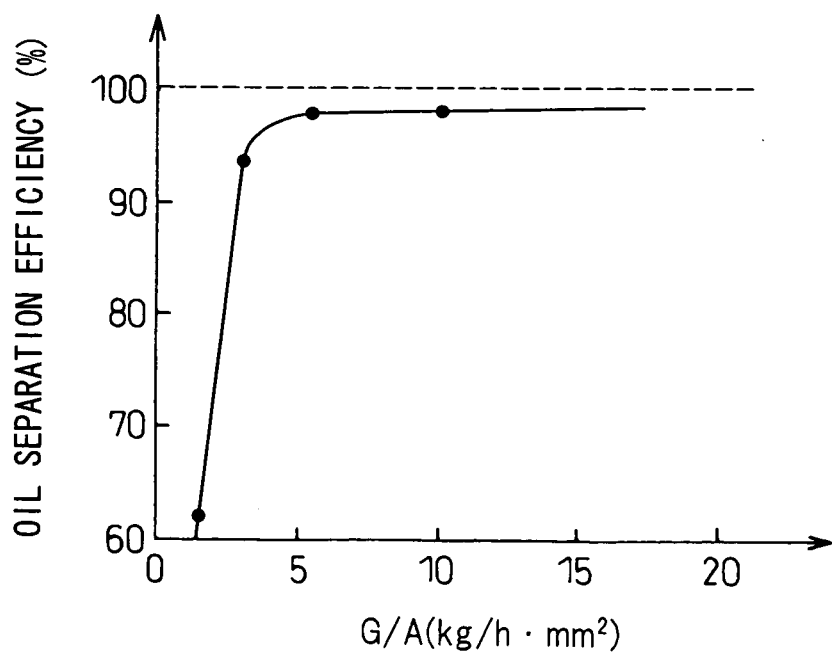
FIG. 2B is a graph showing a relationship between the ratio G/A and oil separation efficiency according to the first embodiment.

Further, the ratio G/A is set equal to or greater than 4 so as to increase the centrifugal force by increasing the velocity of the refrigerant flowing into the separation part 13. As shown in FIG. 2B, when the ratio G/A is equal to or greater than 4, the oil separation efficiency becomes close to 100%. If the ratio G/A is more than 20, the pressure loss of the compressed refrigerant is largely increased and thus the power of the compressor for compensating the energy loss is increased. Therefore, the ratio G/A is set equal to or less than 20.

In the present embodiment, the separation part 13 is configured such that the ratio G/A is at least 4 and at most 20. Therefore, the oil separation efficiency is improved by increasing the centrifugal force in response to an increase in the velocity of the refrigerant flowing in the separation part 13 while reducing the energy loss. In the refrigerant cycle in which the oil separator 11 of the present embodiment is employed, the oil rate in the cycle is reduced and the system COP can be improved. Further, the oil is sufficiently supplied to the compressor. As such, working reliability of the compressor improves. Also, since the sufficient volume of the oil is stored in the oil storage part 15, discharge pulsation can be reduced.

Figure 4:
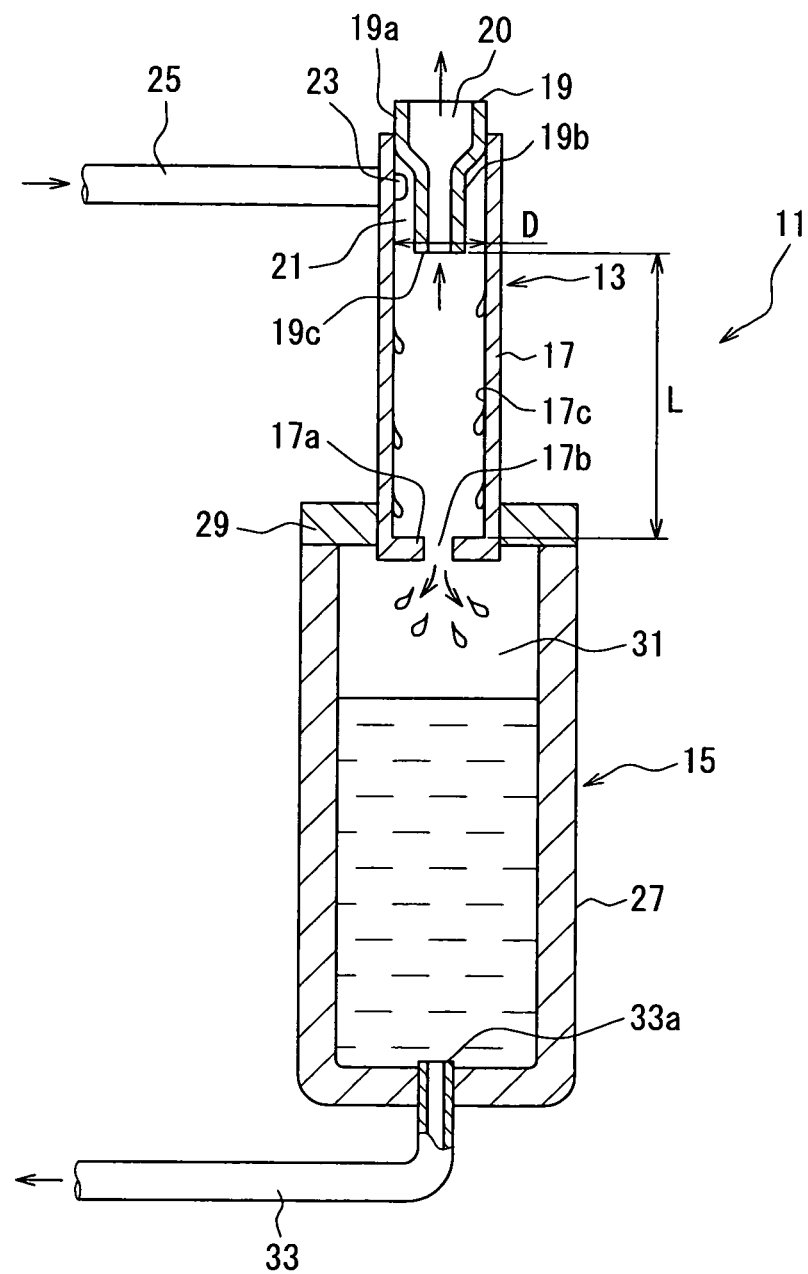
FIG. 4 is a cross-sectional view of an oil separator according to a second embodiment of the present invention.

A second embodiment of the present invention will be described with reference to FIGS. 4 to 6. In the present embodiment, the separation part 13 of the oil separator 11 is configured such that a ratio of a distance L (mm) to an inner diameter D (mm) is equal to or greater than 2.5 (L/D≥2.5). Here, the distance L is a distance from an end 19c of the refrigerant discharge pipe 19 defining an inlet of the discharge passage 20 to an inner surface of the bottom portion 17a of the separation cylinder 17, and the inner diameter D is an inner diameter of the separation cylinder 17.

In general, the $CO_2$ refrigerant has the density greater than the density of the HFC-134a refrigerant. Therefore, the difference in density between the $CO_2$ refrigerant and the oil is smaller than the difference in density between the HFC-134a refrigerant and the oil. With this, the difference in centrifugal force between the $CO_2$ refrigerant and the oil is smaller than the difference in centrifugal force between the HFC-134a refrigerant and the oil.

Therefore, in the case of the $CO_2$ refrigerant, the oil separated from the refrigerant is easily drawn to the refrigerant and flied up. The drawing and flying of the oil results in the decrease in the oil separation efficiency. Therefore, in the oil separator for the $CO_2$ refrigerant cycle, it is necessary to increase the ratio L/D larger than the ratio L/D of the oil separator for the HFC-series refrigerant cycle so as to restrict the drawing and flying of the oil.

Figures 5, 6:
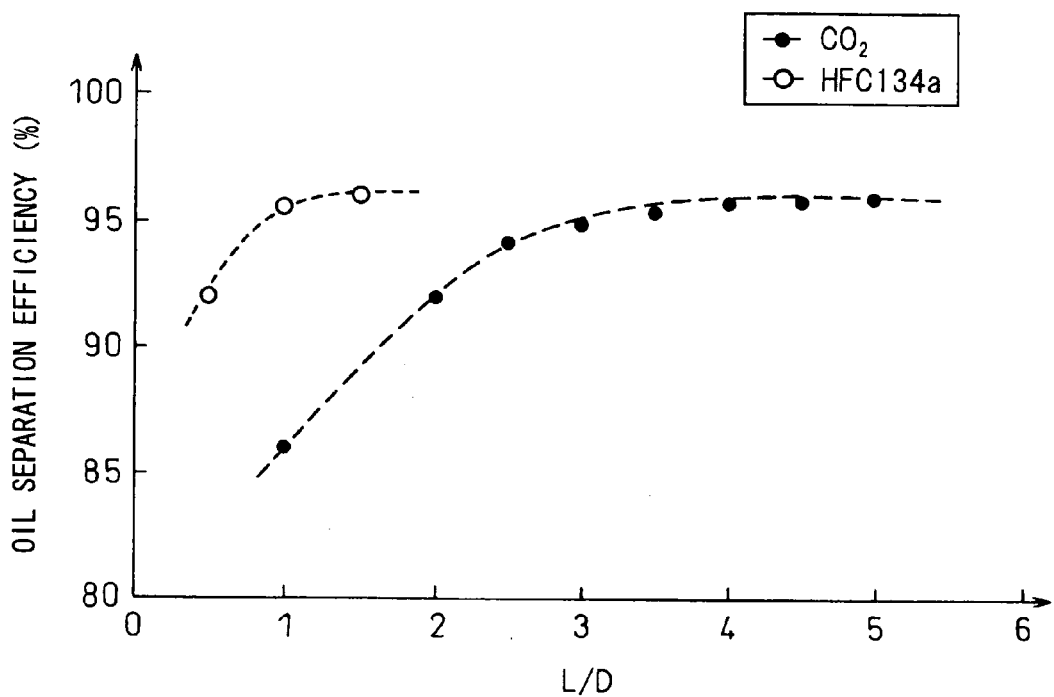
FIG. 5 is a graph showing a relationship between a ratio L/D and oil separation efficiency of the oil separator, in which L is a distance between an end of a refrigerant discharge pipe and a bottom wall of a separation cylinder of the separation part, according to the second embodiment.
FIG. 6 is a chart showing a relationship between the ratio L/D and the oil separation efficiency of the $CO_2$ refrigerant shown in FIG. 5.

FIG. 5 shows a relationship between the ratio L/D and the oil separation efficiency based on the examination result. FIG. 6 shows the relationship between the ratio L/D and the oil separation efficiency in the case of the $CO_2$ refrigerant. As shown in FIG. 5, in the case of the HFC-134a refrigerant, the oil separation efficiency becomes substantially plateau when the ratio L/D is equal to or greater than 1. In the case of the $CO_2$ refrigerant, the oil separation efficiency rapidly increases as the ratio L/D increases toward 2, and becomes substantially plateau as the ratio L/D increases more than 2.5. Further, the oil separation efficiency is plateau as the ratio L/D is greater than 4.

Accordingly, the separation part 13 is configured such that the ratio L/D is equal to or greater than 2.5. In such a case, the flying and the drawing of the oil are restricted and hence the oil separation efficiency improves. Thus, in the refrigerant cycle in which the oil separator 11 of the present embodiment is employed, the oil rate in the cycle is reduced, and the system COP is improved.

Further, since the oil is sufficiently supplied to the compressor, the working reliability of the compressor is improved. Since the sufficient volume of the oil is stored in the oil storage part 15, discharge pulsation can be reduced.

Figure 7:
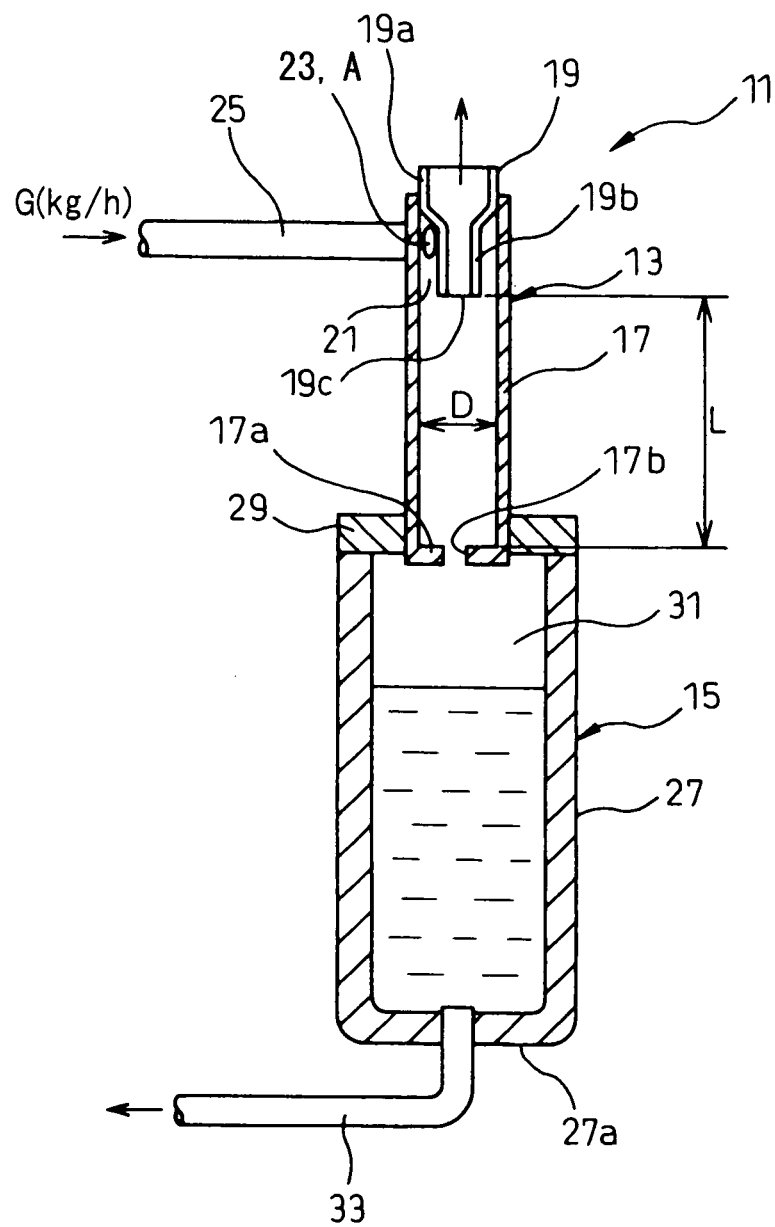
FIG. 7 is a schematic cross-sectional view of an oil separator according to a third embodiment of the present invention.

A third embodiment of the present invention will be described with reference to FIG. 7. In the present embodiment, the separation part 13 is configured such that the ratio G/S is at least 4 and at most 20 similar to the first embodiment and the ratio L/D is at least 2.5 similar to the second embodiment. In such a case, the oil separation efficiency is further improved.

A fourth embodiment of the present invention will be described with reference to FIG. 8. A refrigerant compressor 41 of the present embodiment is a scroll compressor and has a motor part 55 and a compressing part 57. The motor part 55 and the compressing part 57 are housed in a closed housing 53. An oil separator 101 is integrated with the closed housing 53 of the refrigerant compressor 41.

The refrigerant compressor 41 compresses the refrigerant introduced from an external refrigerant circuit, and feeds the compressed refrigerant to the external refrigerant circuit after the oil is separated from the compressed refrigerant by the oil separator 101. The separated oil is returned to necessary portions of the compressor 41 such as a bearing portion and a sliding portion of the compressing part 57. The oil separator 101 generally has a similar structure as the oil separator 11 of any one of the first to third embodiments, except a structure of the oil tank. Thus, components similar to the first to third embodiments are denoted by like reference numerals.

The closed housing 53 of the refrigerant compressor 41 has a first housing member 59, a second housing member 61 and a third housing member 63. The first housing member 59 has a cylindrical shape. The second housing member 61 has a cylindrical shape with a closed end. The second housing member 61 is connected to a first end of the first housing member 59, such as a left end in FIG. 8. The third housing member 63 has a cylindrical shape with a closed end. The third housing member 63 is connected to a second end of the first housing member 59, such as a right end in FIG. 8. The closed housing 53 is configured such that inside pressure is lower than a discharge pressure of the refrigerant. That is, the closed housing 53 forms a so-called low inside pressure housing.

The compressing part 57 has a movable scroll member 69 and a fixed scroll member 71. The movable scroll member 69 is revolved through a crank mechanism 67 that is supported by a first bearing 65. The fixed scroll member 71 is disposed to oppose the movable scroll member 69. The motor part 55 has a shaft 75 that is held horizontally by the first bearing 65 and a second bearing 73. The crank mechanism 67 and the movable scroll 69 are rotated by the shaft 75 of the motor part 55.

The fixed scroll member 71 and the movable scroll member 69 have swirl-like grooves. The movable scroll member 69 is meshed with the fixed scroll member 71 such that multiple working chambers 77 are provided between the grooves. The movable scroll member 69 is worked such that the volume of the working chambers 77 is reduced. With this, the refrigerant introduced in a suction chamber (not shown), which is in communication with a radially outermost space of the groove of the fixed scroll member 71, is compressed.

The working chambers 77 are in communication with a discharge chamber 81 through a discharge port 79. A first end of the inlet pipe 25 of the oil separator 101 is connected to the discharge chamber 81. A second end of the inlet pipe 25 is in communication with the inlet opening 23 of the separation part 13 of the oil separator 101.

An oil return passage 83 is provided adjacent to a lower portion of the fixed scroll member 71. A first end of the oil pipe 33 of the oil separator 101 is connected to a first end of the oil return passage 83. A second end of the oil pipe 33 is connected to an oil tank 89, and forms the oil port 33a. A second end of the oil return passage 83 is in communication with a sliding interface between the fixed scroll member 71 and the movable scroll member 69. The oil return passage 83 is further in communication with other working parts, which need lubrication, through other oil passages.

The separation part 13 of the oil separator 101 has the similar structure as the separation part 13 of the oil separator 11 of any one of the first to third embodiments. A structure of the oil storage part 85 of the oil separator 101 is different from the structure of the oil storage part 15 of the oil separator 11 of the first to third embodiments. Specifically, the oil tank 89 of the oil storage part 85 is constructed of the third housing member 63, which covers the second end of the first housing member 59, and a fourth housing member 91.

The fourth housing member 91 has a substantially disc-like shape and is bonded to a step portion of an end of the third housing member 63. The lower portion of the separation cylinder 17 passes through an upper wall of the third housing member 63 and is bonded with the third housing member 63.

The oil separator 101 of the fourth embodiment works in the similar manner as the oil separator 11 of the first to third embodiments: The refrigerant is conducted from the discharge chamber 81, which is disposed adjacent to the compressing part 57, to the separation part 13 through the inlet pipe 25. The oil is separated from the refrigerant while the refrigerant is whirled in the cylindrical inner space 21 of the separation part 13.

The refrigerant from which the oil is separated is conducted to the refrigerant cycle through the refrigerant discharge pipe 19. The oil separated from the refrigerant is introduced to an oil chamber 93 provided inside of the oil tank 89 through the communication hole 17b. The oil stored in the oil chamber 93 is introduced to the oil return passage 83 through the oil pipe 33 and is further introduced to necessary portions of the compressor, such as the sliding interface between the movable and fixed scroll members 69, 71 and the like.

In the present embodiment, the oil separator 101 is integrated into the refrigerant compressor 41. Therefore, a length of a refrigerant path from the compressing part 57 to the oil separator 101 is reduced. As such, the pressure loss is reduced, and the oil separation efficiency is improved. Further, the entire size of the refrigerant compressor 41 including the oil separator 101 is reduced. Since the oil separator 101 is integrated into the refrigerant compressor 41, the oil can be sufficiently separated from the compressed refrigerant before the refrigerant is introduced to the refrigerant cycle. Thus, the system COP of the refrigerant cycle improves. In addition, since the oil is sufficiently supplied to the compressor 41, the working reliability of the compressor 41 improves.

Figure 8:
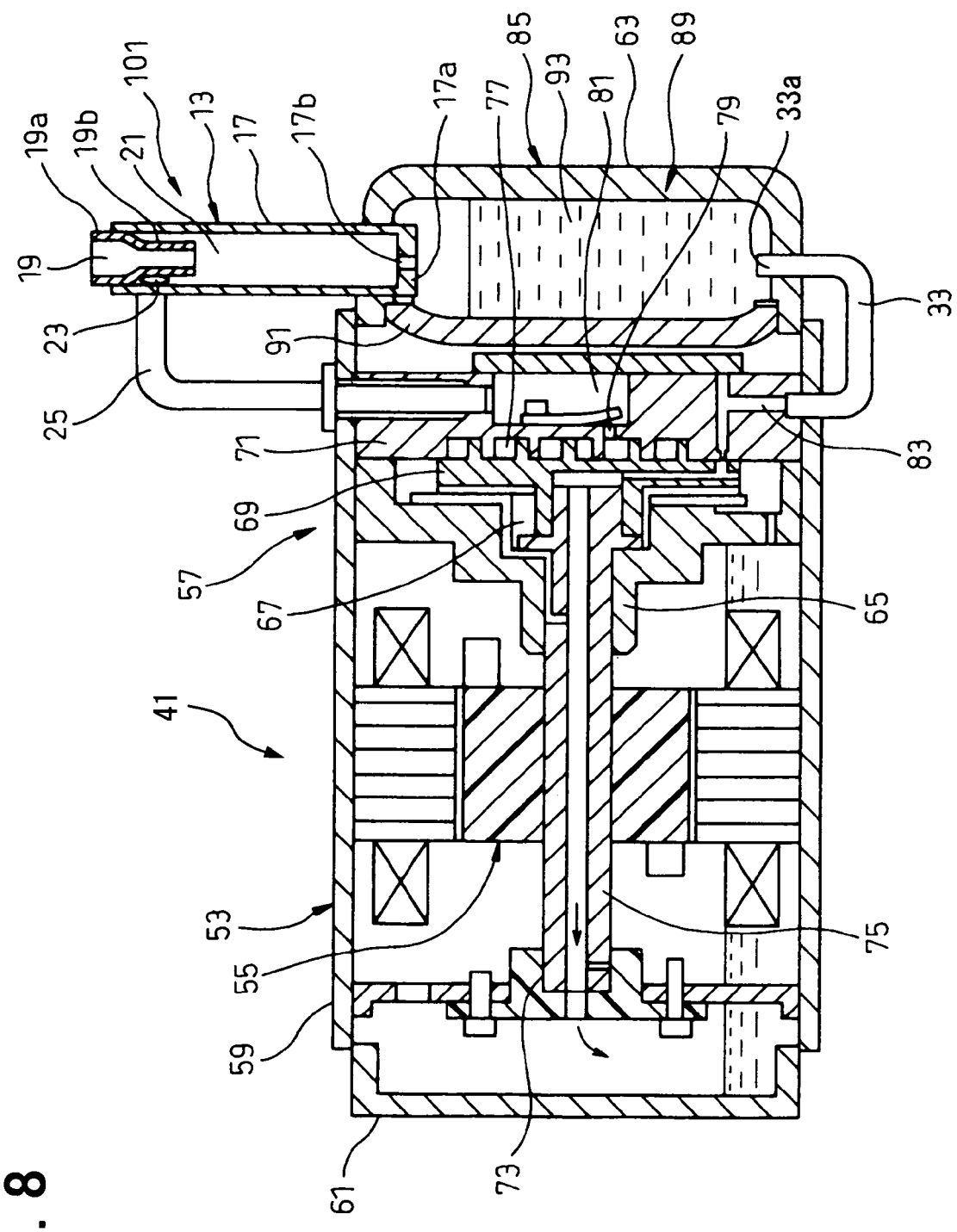
FIG. 8 is a schematic cross-sectional view of a refrigerant compressor with an oil separator according to a fourth embodiment of the present invention.

The refrigerant compressor 41 is not limited to the scroll compressor shown in FIG. 8, but can be any other types, such as a swash plate compressor. Further, the structure of the oil tank 89 is not limited to the above. For example, the oil tank 89 can be constructed similarly to the oil tank 27 of the first to third embodiments. In such a case, the oil tank 27 may be directly connected to the first housing member 59 to cover the second end of the first housing member 59.

Figure 9:
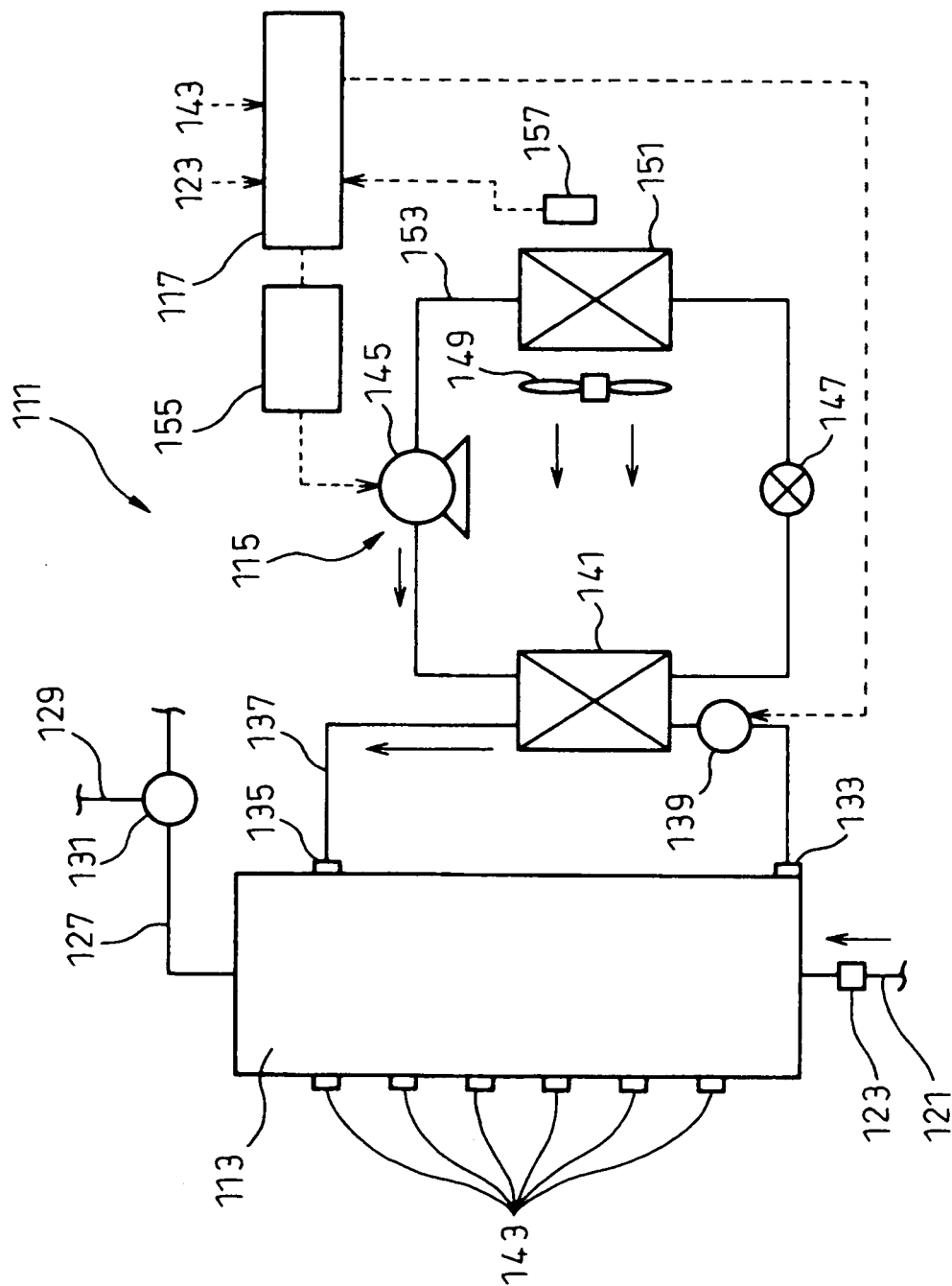
FIG. 9 is a water heating and reserving apparatus having a refrigerant compressor with an oil separator according to a fifth embodiment of the present invention.

A fifth embodiment of the present invention will be described with reference to FIG. 9. A water heating and reserving apparatus 111 of the present embodiment generally includes a hot water storage tank 113, a heat pump device 115 and a control unit 117. The water heating and reserving apparatus 111 is capable of generating hot water for household use such as in a bath room, kitchen and the like.

The hot water tank 113 is capable of keeping the heated water hot. A water introducing pipe 121 is coupled to a bottom portion of the hot water tank 113. Water, such as cold water, is introduced in the hot water tank 113 from the water introducing pipe 121. The water introducing pipe 121 is provided with a thermister 123. The thermister 123 outputs information on temperature of the water passing through the water introducing pipe 121 to the control unit 117.

A water discharge pipe 127 is coupled to an upper portion of the hot water tank 113. The hot water is discharged from the hot water tank 113 through the water discharge pipe 127. A mixing valve 131 is disposed at a downstream portion of the water discharge pipe 127. The water discharge pipe 127 merges with a water supply pipe 129 through which water is supplied at the mixing valve 131.

The mixing valve 131 is capable of adjusting a mixing ratio of the hot water from the hot water tank 113 to the water from the water supply pipe 129. Thus, water having a predetermined temperature can be supplied to a household devices, such as a tap of kitchen or a shower.

The hot water tank 113 is provided with a cold water outlet 133 at the lower portion and a hot water inlet 135 at the upper portion. The cold water outlet 133 and the hot water inlet 135 are connected to a water circuit 137. A pump 139 and a water heat exchanger 141 of the heat pump device 111 are disposed on the circuit 137. The pump 139 and the water heat exchanger 141 are arranged in series to each other. The water in the hot water tank 113 is drawn from the cold water outlet 133 and introduced to the water heat exchanger 141 by the pump 139. The water is heated by the water heat exchanger 141 and returned to the hot water tank 113.

The hot water tank 113 is further provided with multiple thermisters 143. The thermisters 143 are aligned in an up and down direction, and output information on the temperature of the hot water at each water level in the hot water tank 113 to the control unit 117.

The heat pump device 115 is a heating unit for heating the water through $CO_2$ refrigerant. The heat pump device 115 includes an electric compressor 145, the water heat exchanger 141, an expansion valve 147, an exterior heat exchanger 151, and the like. The exterior heat exchanger 151 is provided with a blower 149. The electric compressor 145, the water heat exchanger 141, the expansion valve 147 and the exterior heat exchanger 151 are connected in such an order through refrigerant pipes 153. Thus, the heat pump device 115 forms a closed circuit through which the $CO_2$ refrigerant flows.

An inverter 155 is coupled to the electric compressor 145. The inverter 155 is capable of varying electric power supplied to the electric compressor 145. The exterior heat exchanger 151 is provided with an outside air temperature sensor 157. The outside air temperature sensor 157 detects the temperature of outside air to be introduced to the exterior heat exchanger 151 and outputs information on the temperature of the outside air to the control unit 117.

Here, the refrigerant compressor 41 of the fourth embodiment can be employed as the electric compressor 145. That is, the electric compressor 145 has the compressing part in the low inside pressure housing. Also, the oil separator 101 is integrated into the electric compressor 145. The oil separator 101 has the separation part 13 of any one of the first to third embodiments. Thus, the oil is effectively separated from the compressed $CO_2$ refrigerant by the separation part 13. Accordingly, the performance of the heat pump device 115 improves.

The electric compressor 145 compresses the refrigerant into a high pressure, high temperature condition, and sends the high pressure, high temperature refrigerant to the water heat exchanger 141. The water heat exchanger 141 performs heat exchange between the high pressure, high temperature refrigerant and the water from the hot water tank 113, thereby to heat the water to a predetermined temperature. The heated water is returned to the hot water tank 113. The refrigerant cooled through the water heat exchanger 141 is introduced to the exterior heat exchanger 151 and is heated by heat of the outside air through the exterior heat exchanger 151.

In the water heating and reserving apparatus including a heat pump cycle, heat exchange is performed between the high pressure, high temperature refrigerant and the water, which has specific heat greater than specific heat of air. Therefore, heat exchange efficiency can be improved in accordance with improvement of the oil separation efficiency. The effect of improvement of the heat exchange efficiency is increased largely, such as four times of a cycle in which heat exchange is performed between the refrigerant and air, such as a vehicle air conditioner.

The control unit 117 mainly controls operations of the electric compressor 145 and the pump 139. The control unit 117 receives the information on the temperature of the outside air detected by the outside air temperature sensor 157, and the information on the temperature of the water detected by the thermister 123. Further, the control unit 117 receives the information on the temperature of the hot water and the water level of the hot water tank 113 detected by the thermisters 143. The control unit 117 controls the operations of the electric compressor 145 and the pump 139 based on such information, and hence the water having the predetermined temperature and equal to or more than a predetermined amount is stored in the hot water tank 113.

By employing the refrigerant compressor 41 into which the oil separator 11, 101 is integrated in the water heating and reserving apparatus 111, the system COP is improved in accordance with the improvement of the oil separation efficiency improves. In the heat pump device 115, the water heat exchanger 141 performs heat exchange between the high pressure, high temperature refrigerant and the water, which has the specific heat larger than the specific heat of the air. Thus, the heat exchange efficiency is improved in accordance with the improvement of the oil separation efficiency, and hence the effect of the improvement of the heat exchange efficiency is increased. Accordingly, the heat pump device 115 using the $CO_2$ refrigerant is driven with an improved efficiency, and thus the performance of the water heating and reserving apparatus is improved.

In the present embodiment, the electric compressor 145 is not limited to the low inside pressure type, but can be any other types, such as a high inside pressure type.

Additional advantages and modifications will readily occur to those skilled in the art. The invention in its broader term is therefore not limited to the specific details, representative apparatus, and illustrative examples shown and described.

What is claimed is:

1. An oil separator for a $CO_2$ refrigerant cycle, comprising:
a separation part including a separation cylinder, an inner cylinder and an inlet pipe, the inner cylinder having an outer diameter smaller than an inner diameter of the separation cylinder and disposed in the separation cylinder, the inlet pipe connecting to the separation cylinder tangential to an inner surface of the separation cylinder, such that refrigerant introduced in the separation cylinder from the inlet pipe turns or whirls in a cylindrical inner space along the inner surface of the separation cylinder, the separation part defining an inlet opening in the inner surface of the separation cylinder to allow $CO_2$ refrigerant containing oil from the inlet pipe to enter the separation cylinder, the separation part separating the oil from the $CO_2$ refrigerant by centrifugal force while turning the $CO_2$ refrigerant containing the oil along the inner surface of the separation cylinder; and an oil storage part disposed in communication with the separation cylinder, the oil storage part storing separated oil therein, wherein the separation part provides a ratio G/A of a flow rate G (kg/h) of the $CO_2$ refrigerant flowing into the separation cylinder from the inlet pipe under a rated condition to a cross-sectional area A ($mm^2$) of the inlet opening is at least 4, and at most 20 such that an oil separation efficiency is improved by increasing the centrifugal force in response to an increase in velocity of the refrigerant flowing in the separation part while reducing energy loss.

2. The oil separator according to claim 1, wherein the CO refrigerant cycle is a heat pump cycle for a water heating and reserving apparatus.

3. A refrigerant compressor for a $CO_2$ refrigerant cycle, comprising:
a housing;
a compressing part housed in the housing; and
the oil separator according to claim 1, wherein the oil separator is integrated with the housing.

4. The refrigerant compressor according to claim 3, wherein the housing defines a closed space and inside pressure of the closed space is lower than a discharge pressure of the CO2 refrigerant.

5. The refrigerant compressor according to claim 4, wherein the oil storage part of the oil separator is integrated into the housing.

6. The refrigerant compressor according to claim 3, wherein the refrigerant cycle is a heat pump cycle for a water heating and reserving apparatus.

7. The oil separator according to claim 1, wherein the inner cylinder has a first end within the separation cylinder, the end defining a refrigerant discharge port to allow separated CO2 refrigerant to flow out from the separation part, and a ratio L/D of a distance L (mm) from the end of the inner cylinder to a bottom wall of the separation cylinder communicating with the oil storage part to an inner diameter D (mm) of the separation cylinder is at least 2.5.

8. A refrigerant compressor for a $CO_2$ refrigerant cycle, comprising:
a housing;
a compressing part housed in the housing; and
the oil separator according to claim 7, wherein the oil separator is integrated with the housing.

9. The oil separator according to claim 1, wherein the rated condition is an operating condition used to evaluate performance and efficiency of the CO2 refrigerant cycle based upon an evaluation standard.

* * * * *